F. R. PARMENTER.
AUTOMOBILE JACK.
APPLICATION FILED DEC. 1, 1916.
1,241,011.
Patented Sept. 25, 1917.
2 SHEETS—SHEET 1.
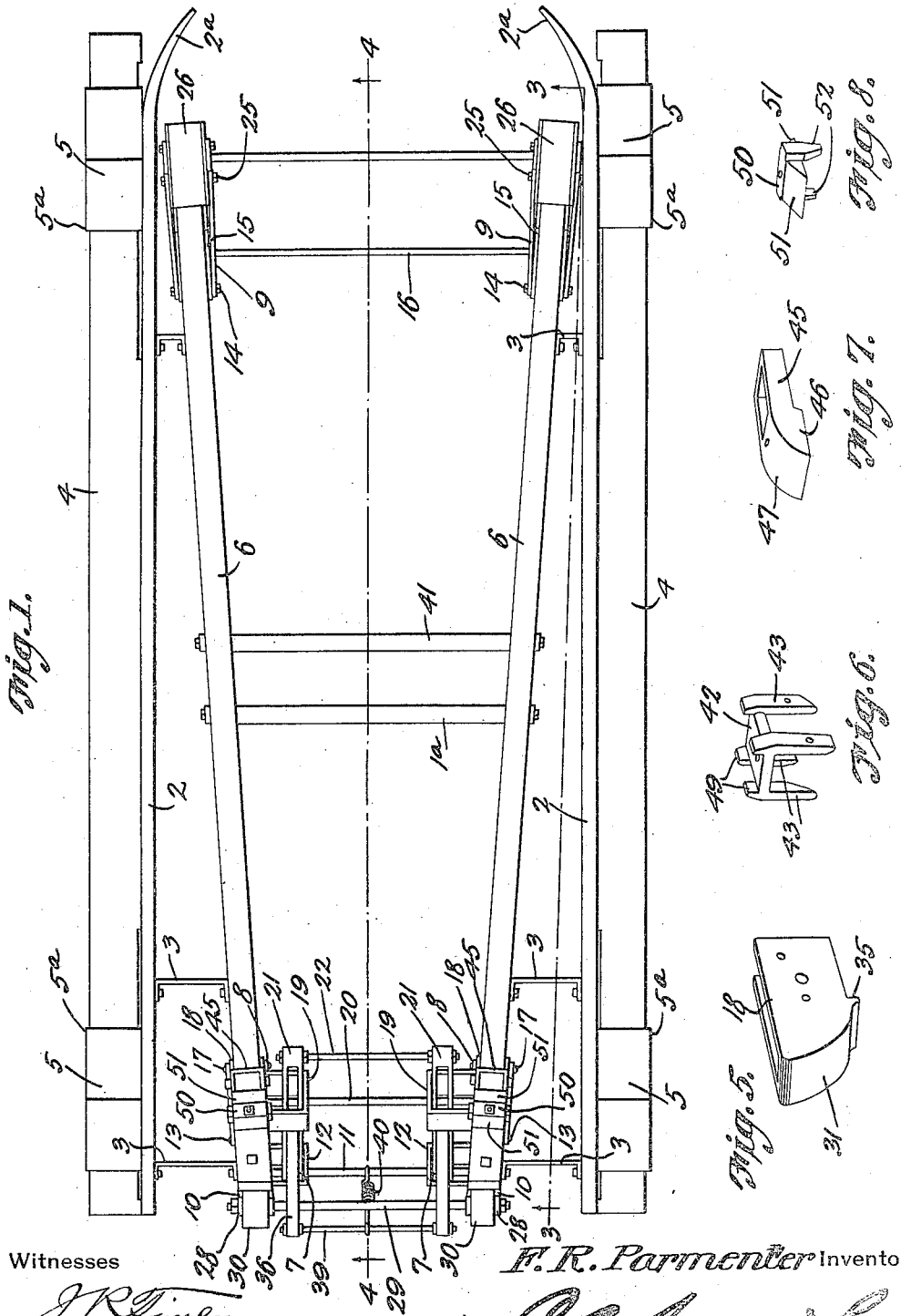

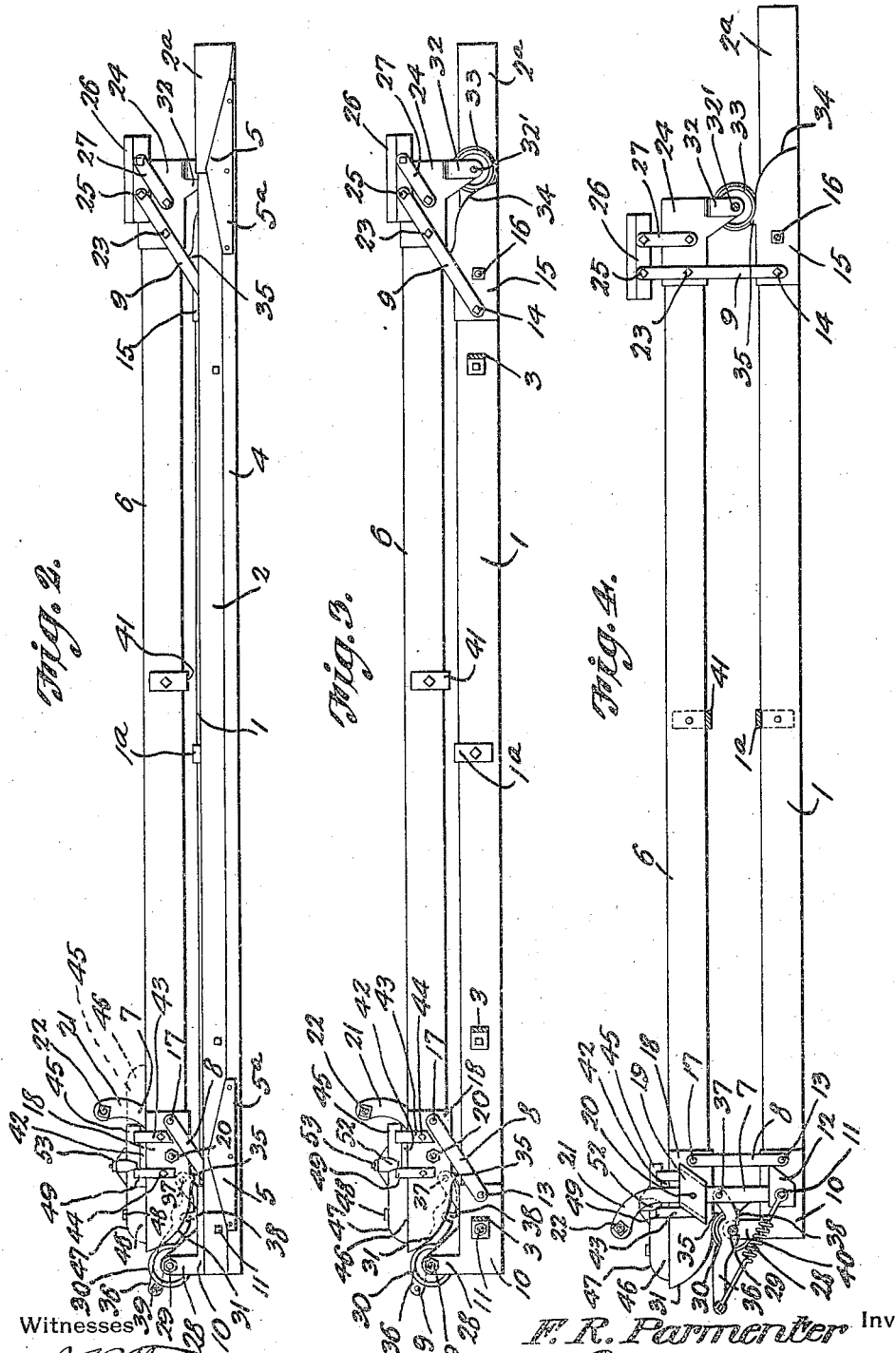

UNITED STATES PATENT OFFICE.

FRANK R. PARMENTER, OF LANSING, MICHIGAN.

AUTOMOBILE-JACK.

1,241,011.                Specification of Letters Patent.     Patented Sept. 25, 1917.

Application filed December 1, 1916. Serial No. 134,399.

*To all whom it may concern:*

Be it known that I, FRANK R. PARMENTER, a citizen of the United States, residing at Lansing, in the county of Ingham and State of Michigan, have invented a new and useful Automobile-Jack, of which the following is a specification.

The present invention relates to automobile jacks, and is particularly an improvement over the automobile jack disclosed in my Patent No. 1,196,392 granted August 29, 1916.

It is the object of the invention to provide a novel and improved device for automatically lifting and supporting an automobile which is run onto the same, so as to relieve the tires of the weight of the car.

The invention also has for its object the provision of a device of the character indicated improved generally in its construction and details to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the jack in prostrate position.

Fig. 2 is a side elevation of the jack in said position.

Fig. 3 is a longitudinal section taken on the line 3—3 of Fig. 1.

Fig. 4 is a central longitudinal section taken on the line 4—4 of Fig. 1 with the parts in position to support the automobile or vehicle.

Figs. 5, 6, 7 and 8 are perspective views of detail parts of the structure.

The structure includes a base having the rearwardly converging sills 1 spaced further apart at their forward ends than at their rear ends. These sills are set upon the floor of the garage or other place, and parallel longitudinal guide bars 2 are set on edge upon the floor at the opposite sides of the sills 1 and are rigidly connected to said sills by means of the braces or brackets 3 between the bars 2 and sills. Flat rails or boards 4 for the wheels of the vehicle to run upon also rest flatly upon the floor and their inner edges are secured in any suitable manner to the guide bars 2. The forward ends $2^a$ of the bars 2 are curved inwardly to guide the wheels onto the boards or rails 4. Doubled inclined blocks 5 are seated upon the rails 4 near their opposite ends, and are adjustable longitudinally according to the wheel base of the automobile, said blocks 5 having depending flanges $5^a$ at their sides to overlap the edges of the rails 4 and adapted to be secured thereto by holding said blocks in their adjusted positions.

Disposed above and parallel with the sills 1 are lift bars 6, which may be constructed either of wood or of metal, the same as the sills 1. The bars 6 are mounted for upward and downward movement by means of links 7, 8 and 9 pivotally connecting said bars with the sills 1. The links 7 are adjacent to the rear ends of the bars 6 at the inner sides of said bars and sills; the links 8 are immediately in front of the links 7 at the inner and outer sides of the bars and sills; while the links 9 are at the forward end of the structure at both the inner and outer sides of the bars 6 and sills 1. A casting 10 is fitted and secured upon the rear terminal of each sill 1, and a transverse rod 11 extends through the said castings, said castings being provided at their inner sides with loop-shaped bearings 12 through which the rod 11 extends, and the lower ends of the links 7 are mounted upon the rod 11 within said bearings 12. The lower ends of the links 8 are pivoted, as at 13, to the castings 10, and the lower ends of the links 9 are pivoted, as at 14, to castings 15 fitted and secured upon the forward terminals of the sills 1. A transverse tie rod 16 is engaged through the castings 15 to assist in bracing the base, and a transverse tie bar or brace $1^a$ is also secured to the sills 1 between their ends. The upper ends of the links 8 are pivoted, as at 17, to castings 18 fitted and secured upon the rear terminals of the lift bars 6, and the castings 18 have loop-shaped bearings 19 at their inner sides through which a transverse rod 20 extends, said rod also extending through the castings 18 themselves, and the links 7 pivotally engaging the rod 20 within the bearings 19. The links 7 are slotted and have curved extensions 21 projecting above the bars 6 and curved rearwardly. The ends of the extensions 21 are connected by a transverse tie rod 22. The links 9 are pivoted, as at 23, to castings 24 fitted and secured upon the forward terminals of the bars 6. The castings 10, 15, 18 and 24 are used upon the ends of the wooden sills and lift bars, whereby to withstand the strains to which the device is subjected. The castings or members 10, 15, 18 and 24 are held in place upon the sills and lift bars by the pivot bolts and other parts extending therethrough.

In order to raise and support the rear axle or rear springs, the links 9 extend upwardly above the pivots 23, and the ends of the extensions are pivoted, as at 25, to supporting members or blocks 26. Additional links 27 are pivotally connected with the blocks or members 26 and castings 24, to assist the links 9 in moving the blocks 26 upwardly and downwardly as the lift bars 6 are moved likewise. When the lift bars 6 are moved forwardly and downwardly, the blocks 26 are moved likewise relative to the lift bars, and when the lift bars are moved forwardly and upwardly, the links 9 being swung will move the blocks 26 forwardly and upwardly relative to the lift bars 6.

The rear sill castings 10 have upstanding brackets 28 through which a transverse rod or shaft 29 is engaged, and rollers 30 are mounted upon said rod within the brackets or standards 28. The ends of the castings 18 are curved, as at 31, to ride over the rollers 30 as the lift bars are raised and lowered. The castings 24 are provided with depending brackets or hangers 32 through which a transverse rod or shaft 32' is engaged, and rollers 33 are mounted upon said rod within the brackets to ride upon the curved ends 34 of the castings 15 as the bars 6 are raised and lowered. The castings 15 and 18 have the stops 35 projecting therefrom to contact with the rollers when the bars 6 are raised, to thereby limit the movement of said bars.

Latches or catches 36 are pivoted, as at 37, within the slots of the links 7 and project rearwardly, being provided between their ends with downwardly opening notches 38 to engage the rods 29 when the bars 6 are in raised position, to thereby hold said bars in said position until the latches are released. The rear free ends of the latches 36 are connected by a transverse rod 39, to which a rope or other flexible element can be connected for raising the latches from the seat of the automobile, thus enabling the automobile to be lowered while the operator is seated therein. A coiled wire retractile spring 40 is terminally connected with the rods 11 and 39 and tends to swing the latches 36 downwardly into engagement with the rod 29, so that said latches will snap into engagement with said rod 29 when the lift bars 6 are raised.

The lift bars 6 can be connected by a transverse tie bar 41 between their ends to strengthen them.

The lift bars are provided with special means for supporting the front axle of the automobile. Thus, plates 42 are seated upon the castings 18 of the lift bars and are provided with depending arms 43 overlapping said castings, whereby the plate 42 and its arms straddle said castings. The arms 43 carry set screws 44 whereby the plates 42 can be firmly held in place by tightening the set screws which bear against the castings 18. A block 45 is seatable on each plate 42 and is provided with a depending portion 46 at one end to seat upon the respective casting 18 and bar 6 beyond either end of the plate 42, the block 45 being reversible to occupy the full line position as seen in Fig. 2, or the dotted line position in said figure. That end of the block 45 having the lug 46 is inclined and curved, as at 47, and each block 45 can be held firmly in place by means of a bolt 48 engaged downwardly therethrough into the bar 6 or casting 18. The plates 42 have upstanding lugs 49 at their opposite side edges for holding the blocks 45 therebetween upon the plates 42. Blocks 50 having the opposite inclined faces 51 are seatable and adjustable upon the blocks 45 and have depending lugs 52 at opposite sides to overlap and straddle the sides of the blocks 45, and the blocks 50 can be held in various adjusted positions by means of bolts 53 extending downwardly therethrough and attached to the plates 42 which are provided with apertures for that purpose.

In use, when the jack is in idle or prostrate position, as seen in Figs. 2 and 3, the automobile can be readily run onto or over the jack, the front axle first passing over the forward end of the jack, and the wheels being guided onto the rails 4 by the curved portions 2ª of the guide bars 2, and said guide bars also serve to hold the wheels upon the rails. When the automobile moves to final position, the wheels thereof run upon the inclines of the blocks 5, and the front axle strikes the extensions 21 of the links 7 and moves said extensions rearwardly due to the momentum of the automobile, thus swinging the links 7, and moving the bars 6 rearwardly and upwardly to automatically jack up the automobile. The front axle can readily pass over the blocks 26, and when the bars 6 are raised, the blocks 26 are raised from the bars 6, and will contact with and raise the rear axle or rear springs properly which are generally spaced further from the ground than the front axle. When the bars 6 are raised, the latches 36 in engaging the rod 29 hold them in this position, and the front axle is engaged and supported by the blocks 45. The blocks 50 can be so adjusted, that the front axle will, in resting upon the incline faces thereof when engaging the extensions 21, shift forwardly slightly away from said extensions, in order that when the latches 36 are raised and the bars 6 moved forwardly and downwardly under the weight of the car, the front axle will be clear of the extensions 21. The blocks 50 are removable and adjustable, and the blocks 45 are removable and reversible, in order that their inclined ends 47 may be brought into play with certain automobiles for accomplishing the same results as the incline faces 51 of the blocks 50.

Having thus described the invention, what is claimed as new is:—

1. An automobile jack embodying sills to rest upon a floor, castings fitted and secured upon the ends of the sills, lift bars above the sills, castings fitted and secured upon the ends of the lift bars, and links pivotally connected with the first and second mentioned castings, the first and second mentioned castings having interengaging means for guiding the lift bars upwardly and downwardly.

2. An automobile jack embodying sills, castings fitted and secured upon the ends thereof, lift bars above the sills, castings fitted and secured upon the ends of the lift bars, links pivoted to the first and second mentioned castings, the castings at one end of the two sills having upstanding brackets, the castings at the other end of the two lift bars having depending brackets, rollers carried by said brackets, the other castings having rounded ends along which said rollers travel when the lift bars are raised and lowered.

3. An automobile jack embodying sills, castings fitted and secured upon the ends thereof, lift bars above the sills, castings fitted and secured upon the ends of the lift bars, links pivoted to the first and second mentioned castings, the castings at one end of the two sills having upstanding brackets, the castings at the other end of the two lift bars having depending brackets, rollers carried by said brackets, the other castings having rounded ends along which said rollers travel when the lift bars are raised and lowered, and having stops to contact with said rollers when the lift bars are raised.

4. An automobile jack embodying a base, lift bars, links connecting the base and lift bars at the ends thereof, the links having upwardly projecting extensions, the extensions at one end of the base being adapted to be engaged by an automobile axle for raising the lift bars, and supporting members pivotally connected with the extensions at the other end of the base to be moved thereby adjacent to the lift bars when they are lowered, and to be raised from the lift bars when the lift bars are raised.

5. An automobile jack embodying a base, lift bars, links connecting the base and lift bars at the ends thereof, the links having upwardly projecting extensions, the extensions at one end of the base being adapted to be engaged by an automobile axle for raising the lift bars, supporting members pivotally connected with the extensions at the other end of the base, and other links pivotally connecting the said supporting members and lift bars so that said supporting members are raised and lowered relative to the lift bars as said lift bars are raised and lowered.

6. An automobile jack embodying a base, lift bars, links connecting said bars and base, some of the links having upwardly projecting extensions to be engaged by the axle of an automobile for raising said bars, plates to rest upon the lift bars and having depending portions for straddling them, said plates having upstanding lugs, blocks seatable upon said plates between said lugs and having portions seatable upon the lift bars at opposite ends of said plates, said portions having inclines, said blocks being reversible, and blocks seatable upon the aforesaid blocks and adjustable thereon, the last mentioned blocks having inclines, the blocks being disposed adjacent to said extensions for supporting the axle.

In testimony that I claim the foregoing as my own, I have hereto affixed my signature in the presence of two witnesses.

FRANK R. PARMENTER.

Witnesses:
 CHAS. F. HAMMOND,
 MARGUERITE O'GRADY.